July 9, 1963  A. WIDMER  3,096,725
PASSENGER CONVEYORS
Filed July 12, 1961  6 Sheets-Sheet 6
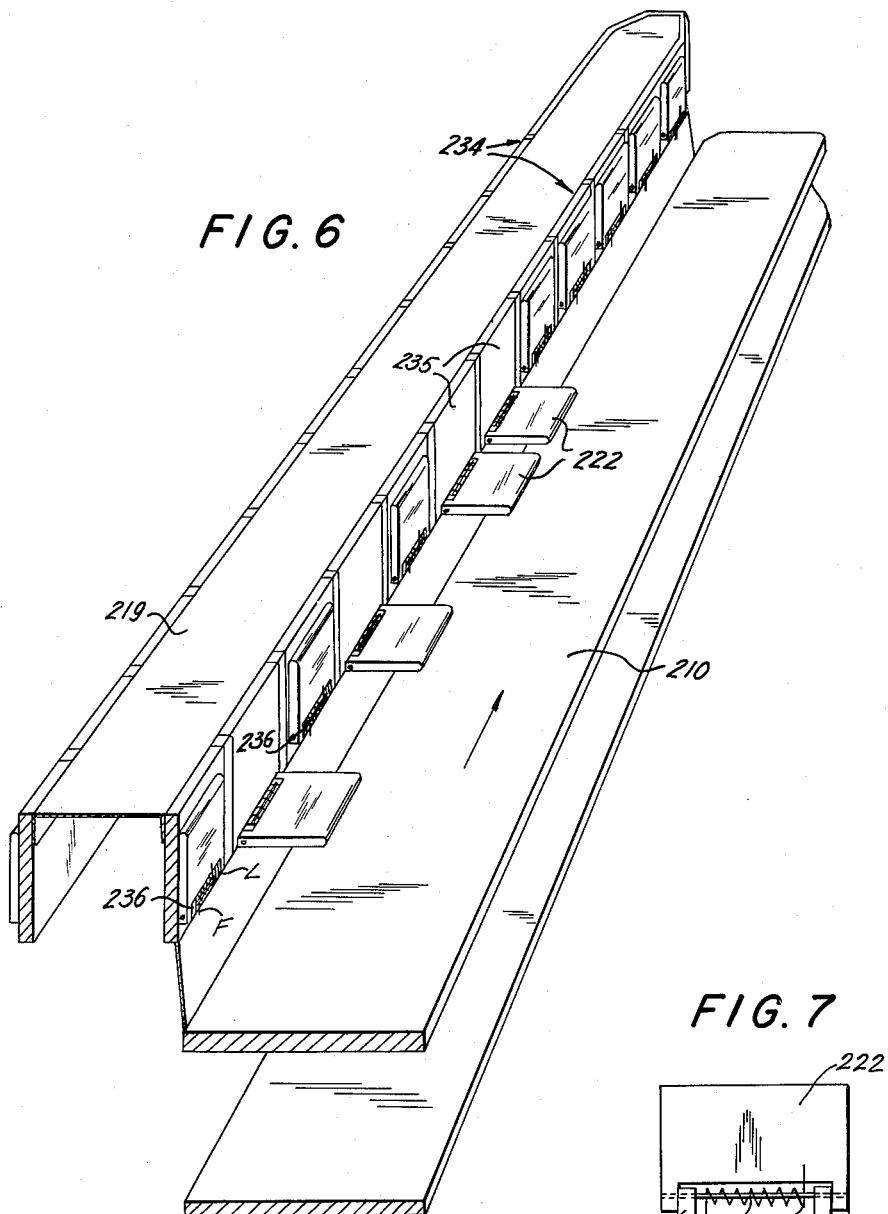
FIG. 6
FIG. 7
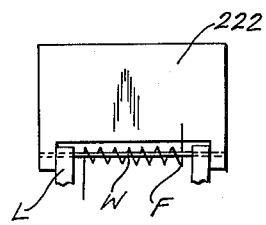
INVENTOR.
ALFRED WIDMER
BY
Michael J. Striker
RH

United States Patent Office 3,096,725
Patented July 9, 1963

3,096,725
PASSENGER CONVEYORS
Alfred Widmer, Bodenhofterrasse 11,
Lucerne, Switzerland
Filed July 12, 1961, Ser. No. 123,584
Claims priority, application Switzerland July 19, 1960
16 Claims. (Cl. 104—25)

The present invention relates to passenger conveyors. More particularly, the invention relates to pasesnger conveyors of the type which are especially suited for use on exhibition grounds, and as public transportation means, and being further suited for use in railroad and subway stations, bus and airline terminals, shopping centers, government or public institutions.

An important object of the invention is to provide a passenger conveyor of the endless band type which is suitable as a comfortable transportation means also over long distances of several hundred meters by providing seating facilities.

Another object of the invention is to provide a passenger conveyor of the just outlined characteristics wherein the seating facilities may be moved out of the way if the passengers do not want to utilize the same or if the number of persons desiring transportation is such that the seated passengers would take up too much space on the conveyor.

A further object of the invention is to provide a conveyor of the above described type which is capable of automatically warning a seated passenger that the trip is almost over so that the passenger is ready to step off at the discharge end of the conveyor.

An additional object of the invention is to provide a passenger conveyor of the above outlined characteristics which not only provides seating facilities but also a back rest for the seated passengers.

Still another object of the invention is to provide a passenger conveyor which is particularly suited for transportation of passengers through distances of medium and substantial length, e.g. in the range of several hundred meters, and which may be used as a horizontal transporting means as well as an escalator whose upper run is at least slightly inclined with respect to a horizontal plane.

A concomitant object of the invention is to provide a conveyor of the above outlined general character which does not occupy more space than the conveyors of which I am aware at this time, which comprises a small number of component parts, and whose seating facilities are arranged in such a way that the passengers may be seated while turned in the direction of forward movement, while facing each other substantially at right angles to the direction of movement and/or in any other desired position.

With the above objects in view, the invention resides in the provision of a passenger conveyor which comprises an endless band having an elongated passenger-supporting upper run, means for moving the band in the longitudinal direction of the upper run, and seating facilities for the passengers provided along the upper run of the endless band. The conveyor further comprises means for moving the seating facilities in the same direction and at the same or nearly the same speed as the upper run of the endless band.

In accordance with a feature of my invention, the endless band comprises a plurality of adjacent plates which form a continuous passenger-supporting apron along the upper run and at least some of which are formed with openings, and the seating facilities assume the form of stool-shaped seats which are reciprocable through the openings in directions preferably perpendicular to the planes of the plates so as to project beyond the plates while moving along the upper run and to be retracted while moving along the inlet and discharge ends of the endless band. The seats may be guided by slotted brackets provided on and extending inwardly from the plates and by rails which latter may guide the seats in such a way that, at a point close to the discharge end of the conveyor, the seats transmit a gentle shove or push to the passenger or passengers seated thereon in order to warn the passengers that the time has arrived to step off the conveyor.

In accordance with another feature of my invention, the seating facilities may assume the form of endless bands whose runs are located at a level above and which move in the same direction and at the same speed as the upper run of the passenger-supporting band to form a continuous bench for the convenience of the passengers. Alternately, the second band may be formed with pivotable plates which may be swung by the passengers into substantially horizontal planes to serve as seats and which may be automatically moved out of the way when not in use, for example, by spring-biased hinges which pivot the plates into substantial parallelism with the run of their endless band. Back rests in the form of endless bands may be provided if desired.

The novel features which are considered as characteristics of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 6 is a fragmentary perspective view of a different passenger conveyor having a plurality of endless bands at least one of which carries a series of swingable seats for the passengers, and FIG. 7 is an enlarged fragmentary detail in plan view of the structure shown in FIG. 6.

Figure 1:
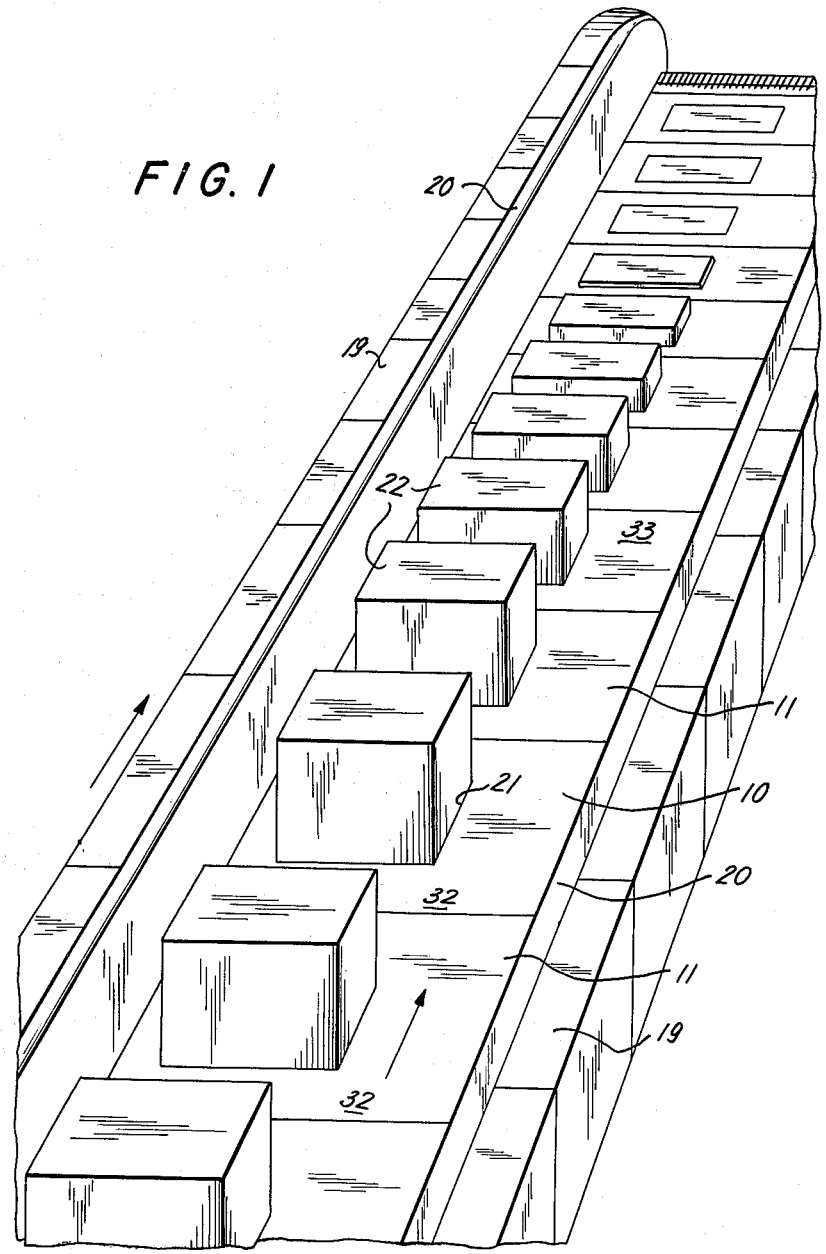
FIG. 1 is a fragmentary perspective view of a passenger conveyor embodying one form of my invention according to which each plate of the main endless band is combined with a projectable and retractable seat.

Referring now in greater detail to the illustrated embodiments, and first to FIGS. 1 to 4, there is shown a passenger conveyor which comprises a main endless band 10 consisting of adjacent plates 11. In the upper run of the main band 10, the plates 11 form a continuous substantially horizontal support or apron for the passengers, and it is assumed that the band moves in a direction from the left to the right, as viewed in FIG. 3. The means for moving the band 10 in the longitudinal direction of its upper run comprises electric motor 12, a driver sprocket 13 at the right-hand end turn of the band whose teeth engage shafts 14 and which is driven by the motor 12, and an idler sprocket 15 at the left-hand end turn of the band. The plates 11 are provided with a pairwise arranged downwardly extending brackets 16 which are rotatably mounted on shafts 14 in such a way that the brackets 16 at the forward ends of trailing plates and the brackets 16 at the rear ends of leading plates are mounted on common shafts. The shafts 14 are provided with rollers 17 which are restricted to travel in endless guideways in the form of rails 18. Such mounting of the plates 11 insures that they are contiguous and are disposed in a common plane to form an apron along the upper run of the band 10 and that they may move slightly apart while advancing along the end turns of the conveyor. The upper run of the band 10 is bounded by a pair of spaced side enclosures or balustrades 19 which extend along the opposite longitudinal sides of the upper run and each of which comprises a handrail in the form of a narrow endless band 20 moving in synchronism with the band 10 and connected with the motor 12 through a suitable reducing gearing or the like, not shown.

In accordance with my invention, the conveyor is provided with seating facilities for the passengers. In the embodiment of FIGS. 1–4, each plate is formed with at least one opening 21 for a reciprocable seating means in the form of a substantially rectangular block or stool 22, and means is provided for moving the stools 22 with the band 10 and for reciprocating the stools with respect to the plates 11 so that the stools may be expelled through and may be retracted into the respective openings 21 in directions substantially perpendicular to the planes of the plates 11. The means for moving the stools 22 with the band 10 comprises an inwardly extending slotted or forked projection or bracket 23 secured to each plate 11. The slots 24 of these brackets receive shafts 25 which are secured to the respective stools by brackets 26, and each shaft 25 carries rollers 27 which are restricted to travel in guideways here shown as rails 28. The inclination of the rails 28 is such that the stools 22 are withdrawn into the respective openings in response to movement of the shafts 25 longitudinally of the slots 24 while the plates 11 move along both end turns and along the lower run of the band 10, and that the stools project through the respective openings to constitute seating facilities for the passengers while the plates move along the upper run of the band, i.e. between the balustrades 19. As shown in FIG. 3, the configuration of the rails 28 is such that the stools begin to move upwardly and beyond the respective plates 11 when the plates enter the upper run and advance in a direction to the right. There is a slight bend or hump 29 in the rails 28 close to the right-hand end turn of the conveyor which causes the stools 22 to project further beyond the plates 11 and to gently bump the passenger or passengers seated thereon thus warning the passengers that it is time to step off the conveyor. At the discharge end of the conveyor, the upper sides of the stools 22 are again flush with the upper sides of the respective plates 11 to provide a continuous floor all the way between the balustrades.

Figure 2:
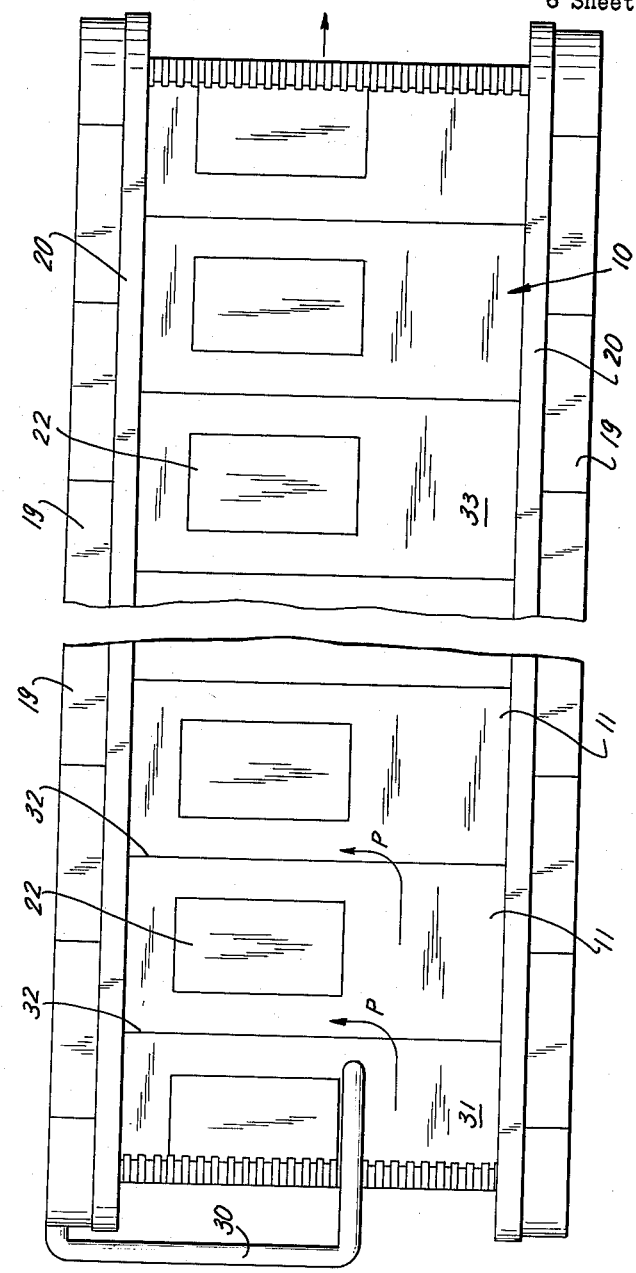
FIG. 2 is a top plan view of the conveyor.
Figure 3:
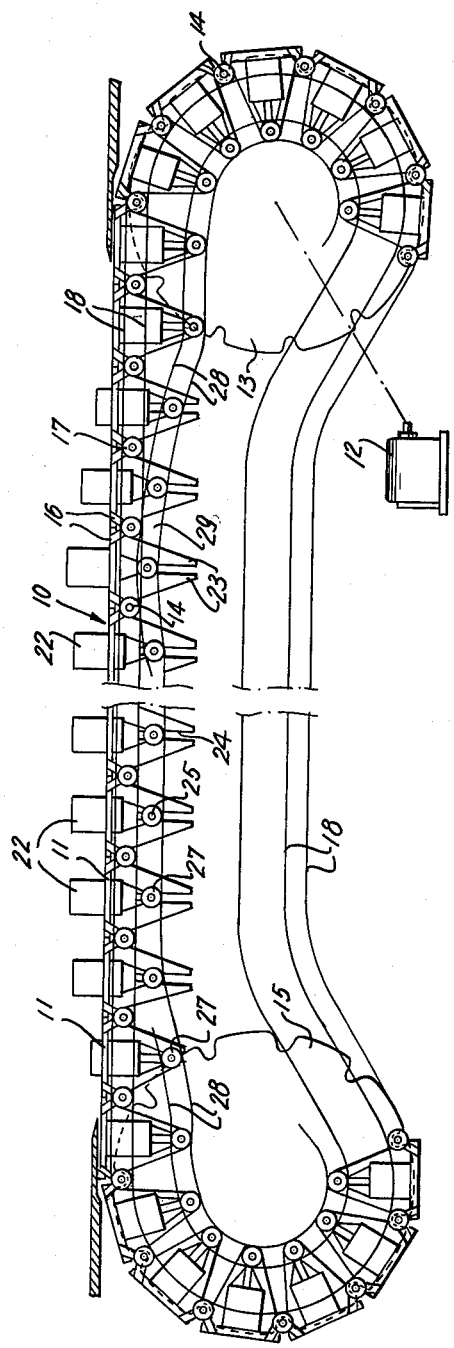
FIG. 3 is a side elevational view of the conveyor with the balustrades omitted.
Figure 4:
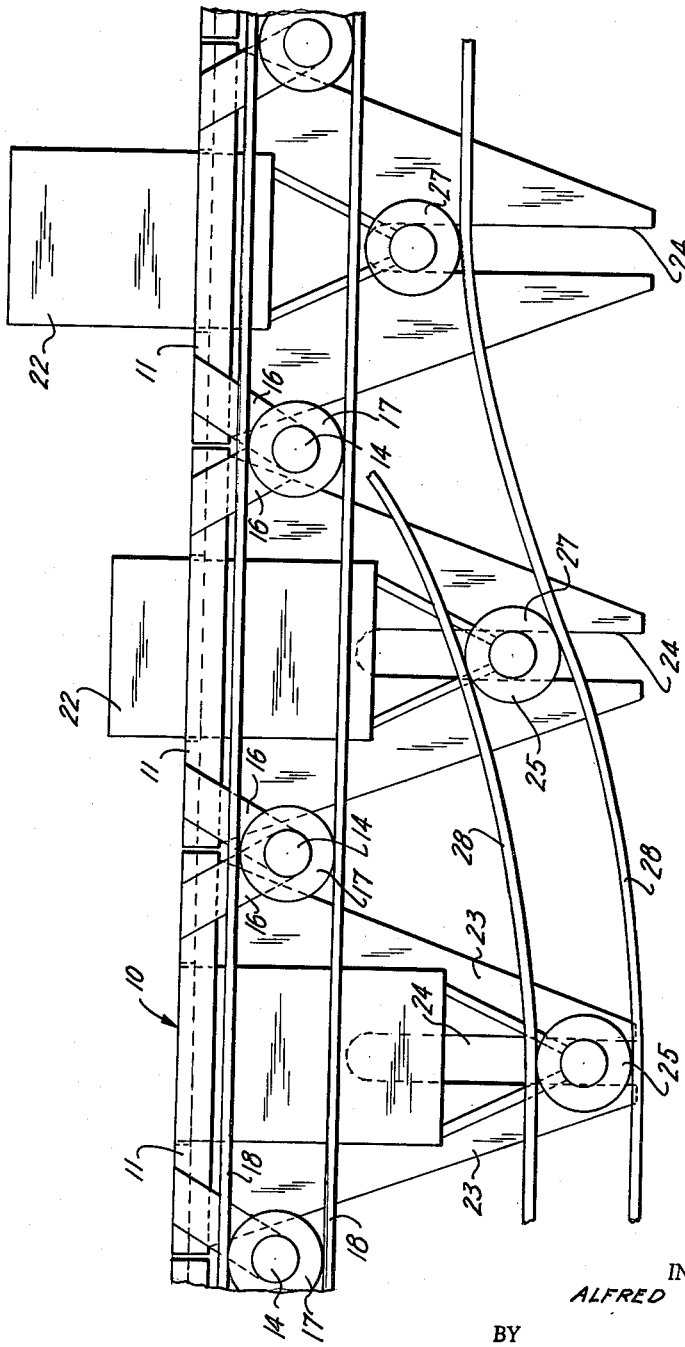
FIG. 4 is an enlarged fragmentary detail view of the structure shown in FIG. 3.

Referring to FIG. 2, the opening 21 in each plate 11 emerging about the left-hand end turn at the inlet end of the conveyor is shielded by a fixed barrier 30 which may be connected with one of the balustrades 19 and which forms with the other balustrade a narrowed passage 31 for the passengers whose desire to ride on the band 10. The stools 22 of the plates 11 which advance beyond the barrier 30 already project beyond the respective plates to such an extent as to be readily detectable by the passengers and to provide convenient seats for one, two or more persons. The spacing between the successive stools is preferably such that they form transverse pathways 32 for the passengers who may enter these pathways in the directions indicated by the arrows P. In the embodiment of FIGS. 1–4, the openings 21 are aligned in the longitudinal direction of the upper run of the band 10 and are uniformly spaced from each other. FIG. 2 shows that the openings 21 and the stools 22 may be closer to the one than to the other balustrade 19 so as to leave a comparatively wide walkway 33 enabling one or more passengers to walk toward the discharge end of the conveyor while the band 10 is in motion. Of course, each plate 11 may be provided with two or more transversely and/or longitudinally aligned or staggered stools 22, depending on the dimensions of the plates and on the overall length of the conveyor. Also, the upper run of the band 10 need not be exactly horizontal but may be at least slightly inclined in upward or downward direction, i.e. the conveyor of my invention may be used as an escalator in warehouses, department stores, railroad or subway stations, airport terminals, government buildings, banks and many other institutions which are visited by large numbers of persons. Furthermore, each plate need not be combined with a stool, or a pair of adjacent plates may be formed with communicating openings to accommodate a single stool.

Figure 5:
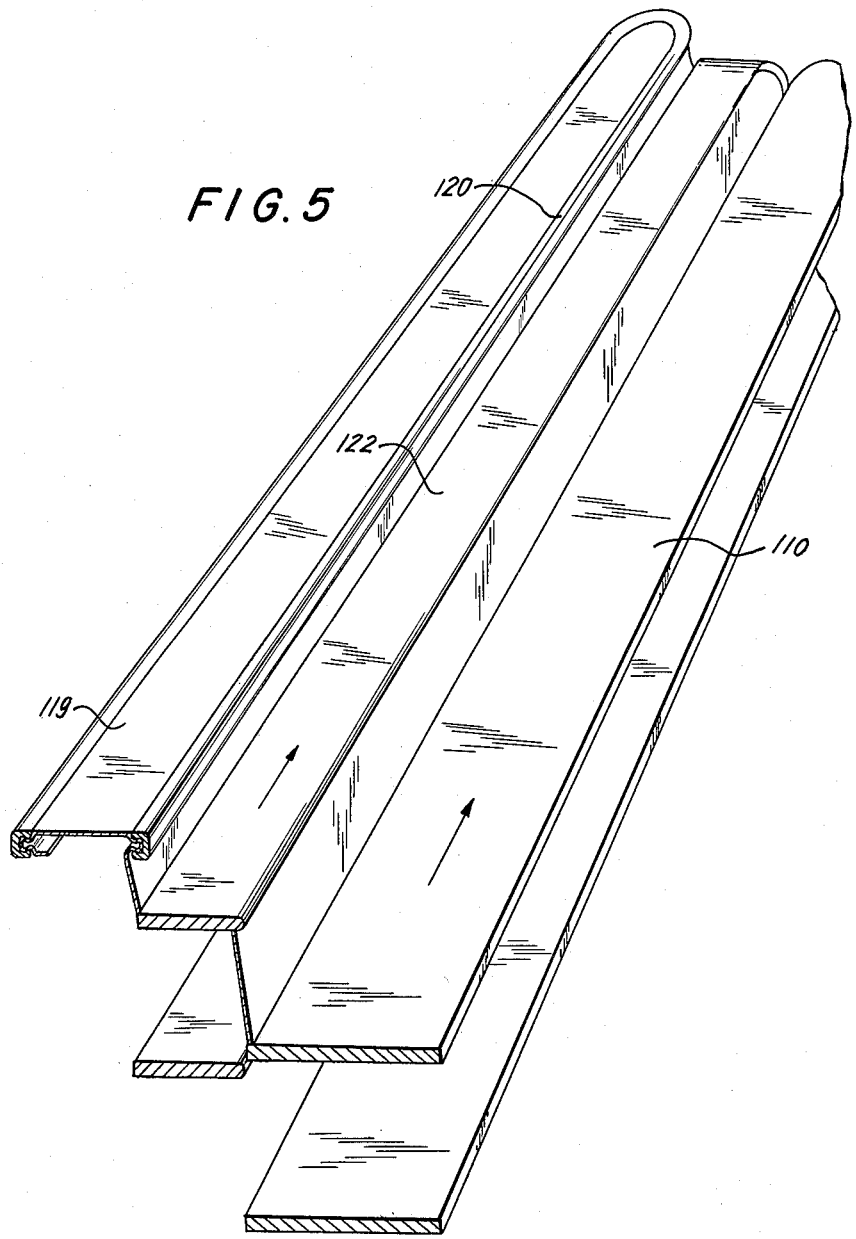
FIG. 5 is a fragmentary perspective view of a modified passenger conveyor which comprises a plurality of endless bands at least one of which serves as a continuous bench for the passengers.

FIG. 5 shows a modified passenger conveyor which comprises a one-piece main endless band 110 corresponding to the main band 10 of FIG. 1, at least one second endless band 122 which replaces the stools 22 and whose upper run is located at a level above and is parallel with and extends laterally along the upper run of the band 110, a pair of balustrades 119 (only one shown), and an endless band 120 on each balustrade to serve as a back rest or hand rail for the passengers. The right-hand run of the band 120 is located at a level above and is parallel with the upper run of the band 122. The movements of the bands 110, 122, 120 are synchronized so that they move in the same direction and at the same speed. The means for moving the band 110 may be the same as shown in FIG. 3, and operative connections (not shown) are provided between the moving means for the band 110 and the bands 120, 122. The passengers standing on the upper run of the main band 110 may utilize the upper run of the band 122 as a seat. In fact, the upper run of the band 122 forms a continuous bench which extends the full length of the conveyor. It will be readily understood that a second endless band 122 may be provided along the other balustrade so that the passengers may sit in two rows and face each other. The band 120 serves as a back rest for the passengers sitting on the band 122. As shown, the upper run of the band 122 may be supported by a shoulder of the balustrade formed between the bands 110 and 120.

The conveyor of FIG. 5 is also suited for use as an escalator. If desired, transversely extending partitions may be provided on the band 122 to prevent the passengers from sliding along the band if the latter's upper run is inclined with respect to a horizontal plane.

Referring to FIG. 6, there is shown a passenger conveyor which is similar to the one illustrated in FIG. 5, excepting that the bands 120, 122 are combined into a single band 234 consisting of a series of articulately connected plates 235. These plates travel about the balustrade 219 in an endless path so that the plane of the plates 235 moving along the inner side of the balustrade 219 is perpendicular to the substantially horizontal plane of the upper run of the band 210. The bands 210, 234 move at the same speed in the direction indicated by the arrow. Each plate 235 carries a foldable plate-like seat 222 which performs the function of the seats 22, 122 and which is connected with the respective plate 235 by spring-biased hinges 236 tending to pivot the seat into face-to-face abutment or at least into substantial parallelism with its plate. As shown in FIG. 6 and in the somewhat enlarged fragmentary view of FIG. 7, each spring-biased hinge 236 consists of a conventional torsion spring F wound on a hinge pin W which is received in end bearings L that are secured to the respective plate 235. The pivot axes of the hinges 236 are substantially parallel with the longitudinal direction of the conveyor though it is also possible to connect the plates 235 and the seats 222 in such a way that the seats may be pivoted into horizontal planes if the plane of the band 210 is inclined, particularly if the conveyor of FIG. 6 is used as an escalator.

The passenger standing on the upper run of the main band 210 can pivot the adjacent plate 222 into horizontal position to utilize this plate as a seat. If the traffic is very heavy, the conveyor can accommodate a large number of passengers provided all the seats 222 are folded upwardly into their idle positions. The plates 235 provide back rests for the passengers occupying the seats 222. A second band 234 may be provided on the other balustrade.

It will be readily understood that the features of the conveyors shown in FIGS. 1, 5 and 6 may be combined in a single conveyor, for example, by providing the other balustrade of the conveyor shown in FIG. 5 with a band 234 of the type shown in FIG. 6 and by replacing the band 110 with a band 10 of the type shown in FIG. 1. Many other combinations are possible.

The seating facilities 22, 122, 222 always travel at the same or nearly the same speed as and in the same direction as the upper run of the main band 10, 110 or 210.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A passenger conveyor comprising, in combination; an endless band including a plurality of adjacent plates at least some of which are formed with opening means, said band having an elongated upper run having a first end and a second end and said plates forming a continuous passenger-supporting apron extending between said ends; means for moving said band in the longitudinal direction of said upper run from said first end toward said second end; a plurality of seats, one for each of said openings; means for moving said seats at the speed of said band; and means for reciprocating said seats in directions substantially perpendicular to the planes of said plates so that the seats project upwardly and beyond the respective plates along said upper run, and that the seats are retracted at said first and second ends of the band.

2. A passenger conveyor comprising, in combination; an endless band including a plurality of adjacent plates each formed with opening means; said band having an elongated upper run having a first end and a second end and said plates forming a continuous passenger-supporting apron extending between said ends; means for moving said band in the longitudinal direction of said upper run from said first end toward said second end; a plurality of substantially block-shaped stools, one for each of said openings; means for moving said stools at the speed of said band; and means for reciprocating said stools in directions substantially perpendicular to the planes of said plates so that the stools project upwardly and beyond the respective plates along said upper run to provide seating facilities for the passengers, and so that the stools are retracted at said first and second ends of the band.

3. A passenger conveyor comprising, in combination; an endless band including a plurality of adjacent plates at least some of which are formed with opening means, said band having an elongated upper run having a first end and a second end and said plates forming a continuous passenger-supporting apron extending between said ends; means for moving said band in the longitudinal direction of said upper run from said first end toward said second end; a plurality of seats, one for each of said openings; means for moving said seats at the speed of said band; and means for reciprocating said seats in directions substantially perpendicular to the planes of said plates so that the seats project upwardly and beyond the respective plates along said upper run, and so that the seats are retracted at said first and second ends of the band, said reciprocating means comprising projections secured to and formed with slots substantially perpendicular to the planes of the plates, shaft means connected with the seats and reciprocably received in the slots of the respective projections, and guideways for guiding the shafts in said slots.

4. A passenger conveyor comprising, in combination; an endless band including a plurality of adjacent plates at least some of which are formed with opening means; said band having an elongated upper run having a first end and a second end and said plates forming a continuous passenger-supporting apron extending between said ends; means for moving said band in the longitudinal direction of said upper run from said first end toward said second end; a plurality of seats, one for each of said openings; means for moving said seats at the speed of said band; and means for reciprocating said seats in directions substantially perpendicular to the planes of said plates so that the seats project upwardly and beyond the respective plates along said upper run, and so that the seats are retracted at said first and second ends of the band, said reciprocating means comprising means adjacent to the second end of said band for projecting the seats further beyond the respective plates to indicate to the passengers occupying the seats that the seats approach the second end of the band.

5. A passenger conveyor comprising, in combination; an endless band including a plurality of adjacent plates at least some of which are formed with opening means, said band having an elongated upper run having a first end and a second end and said plates forming a continuous passenger-supporting apron extending between said ends; a pair of spaced balustrades extending along the opposite longitudinal sides of said upper run, said opening means closer to one of said balustrades than to the other balustrade; means for moving said band in the longitudinal direction of said upper run from said first end toward said second end; a plurality of seats, one for each of said openings; means for moving said seats at the speed of said band; and means for reciprocating said seats in directions substantially perpendicular to the planes of said plates so that the seats project upwardly and beyond the respective plates along said upper run, and so that the seats are retracted at said first and second ends of the band.

6. A passenger conveyor comprising, in combination, a first endless band having an elongated passenger-supporting upper run; a second endless band having a run adapted to provide seating facilities for passengers supported by said upper run and located at a level above and substantially parallel with and laterally offset with respect to said upper run; and means for moving said bands at the same speed in the longitudinal direction of said upper run.

7. A passenger conveyor comprising, in combination, a first endless band having an elongated passenger-supporting upper run; a balustrade laterally adjacent to and extending along the upper run of said band; a second endless band mounted on said balustrade, said second band having a run located at a level above and substantially parallel with said upper run; a third endless band mounted on said balustrade, said third band having a run laterally adjacent to and located at a level above and substantially parallel with the run of said second band; and means for moving said bands at the same speed and in the same direction longtiudinally of said upper run whereby the run of said second band provides seating facilities and the run of said third band provides a back rest for the passengers on said upper run.

8. A passenger conveying comprising, in combination, a first endless band having an elongated passenger-supporting upper run; a second endless band laterally adjacent to and having a run extending along and located at a level above the upper run of said first band; a plurality of seats connected to said second band; and means for moving said bands at the same speed and in the same direction longitudinally of said upper run whereby said seats may be occupied by the passengers on said upper run.

9. A passenger conveyor comprising, in combination, a first endless band having an elongated passenger-supporting upper run; a second endless band laterally adjacent to and having a run extending along and located at a level above the upper run of said first band; a plurality of plates; means for articulately connecting each of said plates to said second band so that each plate is pivotable into a substantially horizontal plane in which it provides a seat; and means for moving said bands at the same speed and in the same direction longitudinally of said upper run whereby said plates may be pivoted and occupied by the passengers on said upper run.

10. A passenger conveyor comprising, in combination, a first endless band having an elongated substantially horizontal passenger-supporting upper run; a second endless band laterally adjacent to and having a run extending along and located at a level above the upper run of said first band, said upper run disposed in a substantially horizontal plane and the run of said second band disposed in a substantially vertical plane; a plurality of plates; spring biased means connecting said plates to the second band so that the plates adjacent to the run of said second band are pivotable about substantially horizontal axes into substantial parallelism with the run of said second band and into substantially horizontal planes to provide seats for the passengers on said upper run; and means for moving said bands at the same speed and in the same direction longitudinally of said upper run.

11. A passenger conveyor comprising, in combination, a first endless band having an elongated substantially horizontal passenger-supporting upper run; a second endless band laterally adjacent to and having a run extending along and located at a level above the upper run of said first band, said upper run disposed in a substantially horizontal plane and the run of said second band disposed in a substantially vertical plane; a plurality of plates; spring biased means for connecting said plates to the second band so that the plates adjacent to the run of said second band are pivotable about substantially horizontal axes and for permanently biasing the plates into substantial parallelism with said second band, said plates pivotable into substantially horizontal planes against the bias of said connecting means to provide seats for the passengers on said upper run; and means for moving said bands at the same speed and in the same direction longitudinally of said upper run.

12. A passenger conveyor comprising, in combination; an endless band including a plurality of adjacent plates at least some of which are formed with opening means, said band having an elongated upper run having a first end and a second end and said plates forming a continuous passenger supporting apron extending between said ends; means for moving said band in the longitudinal direction of said upper run from said first end toward said second end; a plurality of seats, one for each of said openings; means for moving said seats at the speed of said band; means comprising a fixed barrier for preventing access to the openings of the plates at said first end and means for reciprocating said seats in directions substantially perpendicular to the planes of said plates so that the seats project upwardly and beyond the respective plates along said upper run, and so that the seats are retracted at said first and second ends of the band.

13. A passenger conveyor as set forth in claim 12, further comprising a pair of spaced balustrades extending longitudinally along the opposite sides of said upper run, said barrier connected with one of said balustrades and forming with the other balustrade a passage in which the passengers may step onto the upper run of said band.

14. A passenger conveyor as set forth in claim 12, wherein said openings are aligned in the longitudinal direction of said upper run.

15. A passenger conveyor as set forth in claim 14, wherein said openings are uniformly spaced from each other.

16. A passenger conveyor as set forth in claim 14, wherein said openings are closer to one of said balustrades than to the other balustrade and said seats form with the other balustrade a walkway in which the passengers may proceed on and toward the second end of said upper run.

References Cited in the file of this patent
UNITED STATES PATENTS

| | | |
|---|---|---|
| 449,126 | Little | Mar. 31, 1891 |
| 1,079,651 | Kintner | Nov. 25, 1913 |
| 1,665,483 | Taylor | Apr. 10, 1928 |
| 2,044,134 | Storer | June 16, 1936 |
| 2,905,100 | Kendall | Sept. 22, 1959 |
| 2,936,873 | Seidman | May 17, 1960 |
| 2,981,202 | Turner | Apr. 25, 1961 |

FOREIGN PATENTS

| | | |
|---|---|---|
| 1,165,513 | France | June 2, 1958 |